May 23, 1972  K. I. MAGNUSSON ET AL  3,664,531
DEVICE FOR IMPARTING A ROTATIONAL AS WELL AS A LONGITUDINAL
MOVEMENT TO TUBES OR RODS
Filed Nov. 19, 1969
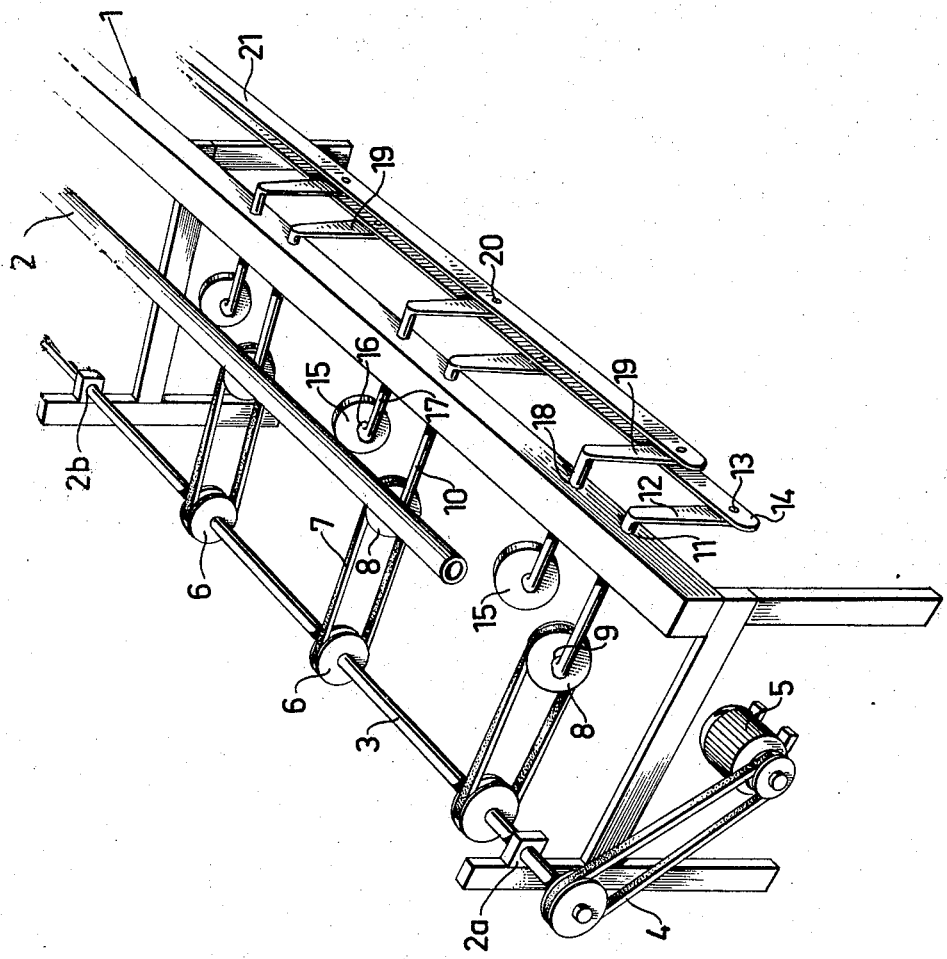
INVENTORS
KJELL I. MAGNUSSON
AND RUNE T. OWARFORT
By *Linton and Linton*
ATTORNEYS United States Patent Office 3,664,531
Patented May 23, 1972

3,664,531
DEVICE FOR IMPARTING A ROTATIONAL AS WELL AS A LONGITUDINAL MOVEMENT TO TUBES OR RODS
Kjell I. Magnusson, Fack 33 67050, Eda Charlottenberg, Sweden, and Rune T. Owarfort, Lya O. Karup, Ostra Karup, Sweden
Filed Nov. 19, 1969, Ser. No. 878,097
Int. Cl. B65h 51/26
U.S. Cl. 214—339                          2 Claims

ABSTRACT OF THE DISCLOSURE

A device for supporting an elongated work piece such as tubes or rods with circular or annular section during treatment thereof and giving the work piece a rotational feeding movement as well as a longitudinal feeding movement with the speed of the longitudinal movement being very slow as compared with the rotational movement of the workpiece.

This invention refers to a device which is intended to be used in surface treating of circular tubes or rods.

The main object of the invention is to provide a simple and fully automatic manufacturing procedure by means of which tubes and rods may be finished to receive good surface conditions.

The invention will now be described with reference to the accompanying drawing which in perspective shows a preferred embodiment of the invention.

The invention consists in a device for imparting to a work piece such as a tube or a rod a rotational as well as a longitudinal feed movement. The speed of the longitudinal movement must be very small compared to the rotational movement and the speeds have to be varied within relatively wide limits. The device according to the invention thus includes a support 1 which has two bearings 2a, 2b, which serve to support a shaft 3, which in one end is provided with a pulley or the like which by means of a pulley belt 4 is in driving connection with a motor 5, preferably an electric motor. To the shaft 3 are secured a plurality of pulleys or rollers 6 which via pulley belts 7 are in driving connection with other pulleys or rollers 8, which are rotatably mounted about shafts 9, which in turn are secured to or made integral with shafts 10, which pass through holes 11 in the support and in their free ends are securedly fixed to link arms 12, which at 13 are pivotally connected to a parallel arm 14, extending in the feed direction of the tubes or rods. Another series of rollers 15 are rotatably mounted about shafts 16, which are secured to or integral with shafts 17, which like shafts 10 in their free ends are securedly fixed to link arms 19, which at 20 are pivotally connected to a parallel arm 21 for simultaneously operating all of the rollers 15.

The rollers 8 are, as shown in the drawing driven while the rollers 15 are freely rotatable. In order to achieve the feeding movement of the tube 22, rod or similar work piece, which is to be treated, at least the driven rollers 8 are set obliquely and it is obvious that the whole series of rollers 8 and 15 may be simultaneously set in an angular position by operating the parallel arms 14 and 21.

The objects 22, which are to be treated, are in this manner transported between different treatment stations such as a blasting station, one or more metallising stations and one or more grinding or polishing stations.

By arranging the treatment stations at such distances from each other that the treatment zones caused by said treatment stations are axially displaced relative to each other it is possible to eliminate its overlapping phenomena.

By varying the surface speed of the tubes, their feeding speed and the efficiency of the treatment stations any desired thickness or treatment depth may be held with great accuracy. In order to protect the tubes or rods, the rollers 8 and 15 may be provided with a suitable coating such as rubber or the like.

The device described hereabove makes it possible to obtain a surface treatment, which is considerably cheaper and gives better results than electrical coat of zinc or similar methods, heretofore used.

This invention is not limited to treatment by surface coating but the stations may include units for grinding or similar metal removing treatment.

I claim:

1. A device for imparting to elongated work pieces such as tubes or rods with circular or annular section a rotational movement as well as a longitudinal movement with the speed of the latter being very slow compared to the first mentioned movement and comprising a plurality of rollers being arranged in pairs with one roller on each side of a vertical symmetry plane through the work piece and such that the pairs of rollers constitute a guiding and supporting chute for the work piece and with their axis in planes parallel to each other and to a longitudinal plane through the work piece, means rotatably supporting the rollers on one side of said vertical symmetry plane, a plurality of turnably mounted shafts, a plurality of stub shafts each attached to and extending laterally of one of said turnable shafts, the ones of said rollers on the other side of said vertical plane each having the configuration of a pulley and being rotatably mounted on one of said stub shafts, a rotatably mounted driven shaft extending in the feed direction of the work piece, pulleys attached to said driven shaft, endless belts each extending around one of said pulleys and one of said pulley shaped rollers, link arms each attached to one of said turnable shafts and an operating arm pivotally connected to said link arms whereby movement of said operating arm will simultaneously tilt all of said pulley shaped rollers.

2. A device as claimed in claim 1 wherein said roller supporting means consists of turnably supported shafts, stub axles each attached to and extending laterally of one of said turnable shafts, said rollers supported by said means each being rotatably mounted on one of said stub axles, links each attached to one of said turnable shafts and a second operating arm pivotally connected to said links.

References Cited

UNITED STATES PATENTS

| 3,260,390 | 7/1966 | Morain | 214—339 |
| 3,322,291 | 5/1967 | Smith | 214—339 |
| 3,371,806 | 3/1968 | Anderson | 214—339 |

ROBERT G. SHERIDAN, Primary Examiner